(12) United States Patent
Landes et al.

(10) Patent No.: US 8,615,110 B2
(45) Date of Patent: Dec. 24, 2013

(54) AUTOMATED TRACK SURVEYING AND DITCHING

(71) Applicant: Herzog Railroad Services, Inc., St. Joseph, MO (US)

(72) Inventors: Nathan A. Landes, St. Joseph, MO (US); Ivan E. Bounds, St. Joseph, MO (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 0 days.

(21) Appl. No.: 13/778,831

(22) Filed: Feb. 27, 2013

(65) Prior Publication Data

US 2013/0230212 A1 Sep. 5, 2013

Related U.S. Application Data

(60) Provisional application No. 61/605,307, filed on Mar. 1, 2012.

(51) Int. Cl.
*G06K 9/00* (2006.01)

(52) U.S. Cl.
USPC ................ 382/104; 382/217; 37/104; 701/19

(58) Field of Classification Search
USPC .......................... 382/104, 217; 37/104; 701/19
See application file for complete search history.

(56) References Cited

U.S. PATENT DOCUMENTS

| | | |
|---|---|---|
| 4,065,856 A | 1/1978 | Waters |
| 4,338,031 A | 7/1982 | Miller et al. |
| 4,400,897 A | 8/1983 | Scheuchzer et al. |
| 4,700,223 A | 10/1987 | Shoutaro et al. |

(Continued)

FOREIGN PATENT DOCUMENTS

| | | |
|---|---|---|
| EP | 1418273 B1 | 11/2005 |
| FR | 2867491 | 9/2005 |
| FR | 2890086 | 3/2007 |
| FR | 2913392 | 3/2007 |

OTHER PUBLICATIONS

International Application No. PCT/US 12/60786, PCT Notification of Transmittal of the International Search Report and the Written Opinion of the International Searching Authority, or the Declaration, mailed Jan. 7, 2013.

(Continued)

*Primary Examiner* — David Zarka
*Assistant Examiner* — Katrina Fujita
(74) *Attorney, Agent, or Firm* — Erickson, Kernell, Derusseau & Kleypas, LLC

(57) ABSTRACT

A method of surveying a section of a railway to determine amounts of soil to be excavated or added at selected position coordinates of track locations includes moving a survey vehicle along the railway, optically scanning the track structure at selected intervals to obtain optical data points with position coordinates, recording images at the intervals with position coordinates, recording position coordinates of drainage points, processing the optical data points to derive ditch overlays formed by ditch profiles associated with locations along the track and ditch templates, detecting anomalous soil unit weights associated with track locations, reviewing images associated with the locations of the anomalous units, adjusting the ditch overlays as necessary, and loading the adjusted data into a computer of an excavator device for display to guide an excavator operator in reshaping the ditches along the track according to the detected position of the excavator device.

21 Claims, 10 Drawing Sheets

(56) References Cited

U.S. PATENT DOCUMENTS

| | | | |
|---|---|---|---|
| 4,888,890 A | 12/1989 | Studebaker et al. | |
| 4,890,958 A * | 1/1990 | Dancer | 405/180 |
| 4,924,374 A | 5/1990 | Middleton et al. | |
| 5,157,840 A | 10/1992 | Henttinen | |
| 5,235,511 A | 8/1993 | Middleton et al. | |
| 5,243,918 A | 9/1993 | Bounds | |
| 5,284,097 A | 2/1994 | Peppin et al. | |
| 5,289,780 A | 3/1994 | Bounds | |
| 5,311,822 A | 5/1994 | Bounds | |
| 5,331,745 A | 7/1994 | Jager | |
| 5,361,704 A | 11/1994 | Bounds | |
| 5,375,663 A | 12/1994 | Teach | |
| 5,423,268 A | 6/1995 | Bounds | |
| 5,605,099 A | 2/1997 | Sroka et al. | |
| 5,657,700 A | 8/1997 | Bounds | |
| 5,721,685 A | 2/1998 | Holland et al. | |
| RE36,685 E | 5/2000 | Bounds | |
| 6,058,628 A | 5/2000 | Theurer et al. | |
| 6,128,558 A | 10/2000 | Kernwein | |
| 6,161,986 A | 12/2000 | Smith et al. | |
| 6,324,455 B1 | 11/2001 | Jackson | |
| 6,356,299 B1 | 3/2002 | Trosino et al. | |
| 6,526,339 B1 | 2/2003 | Herzog et al. | |
| 6,647,891 B2 | 11/2003 | Holmes et al. | |
| 6,691,437 B1 | 2/2004 | Yost et al. | |
| 6,704,626 B1 | 3/2004 | Herzog et al. | |
| 6,758,147 B2 | 7/2004 | Howard et al. | |
| 6,804,621 B1 | 10/2004 | Pedanckar | |
| 6,862,822 B1 * | 3/2005 | Masse | 37/104 |
| 6,886,644 B2 * | 5/2005 | Stump et al. | 175/61 |
| 6,976,324 B2 | 12/2005 | Theurer et al. | |
| 6,981,452 B2 | 1/2006 | Herzog et al. | |
| 7,050,926 B2 | 5/2006 | Theurer et al. | |
| 7,139,662 B2 | 11/2006 | Ericsson et al. | |
| 7,152,347 B2 | 12/2006 | Herzog et al. | |
| 7,246,456 B2 | 7/2007 | Wray | |
| 7,260,241 B2 * | 8/2007 | Fukuhara et al. | 382/103 |
| 7,307,710 B2 | 12/2007 | Gatsios et al. | |
| 7,428,453 B2 | 9/2008 | Davenport et al. | |
| 7,437,997 B2 | 10/2008 | Herzog et al. | |
| 7,469,479 B2 | 12/2008 | Jager | |
| 7,562,563 B2 | 7/2009 | Wee | |
| 7,616,329 B2 | 11/2009 | Villar et al. | |
| 7,707,943 B2 | 5/2010 | Herzog | |
| 7,707,944 B2 | 5/2010 | Bounds | |
| 7,755,774 B2 | 7/2010 | Farritor et al. | |
| 7,765,935 B2 | 8/2010 | Bounds | |
| 7,920,984 B2 | 4/2011 | Farritor | |
| 7,969,558 B2 | 6/2011 | Hall | |
| 8,081,320 B2 | 12/2011 | Villar et al. | |
| 8,181,577 B2 | 5/2012 | Bounds | |
| 2002/0073882 A1 | 6/2002 | Howard et al. | |
| 2002/0178625 A1 | 12/2002 | Kimble et al. | |
| 2005/0278982 A1 | 12/2005 | Herzog et al. | |
| 2006/0096131 A1 * | 5/2006 | Hall | 37/104 |
| 2007/0024468 A1 | 2/2007 | Quadel et al. | |
| 2007/0150130 A1 | 6/2007 | Welles et al. | |
| 2008/0141893 A1 | 6/2008 | Herzog et al. | |
| 2009/0037039 A1 | 2/2009 | Yu et al. | |
| 2009/0273788 A1 | 11/2009 | Nagle, II | |
| 2010/0004804 A1 | 1/2010 | Anderson et al. | |
| 2010/0106415 A1 * | 4/2010 | Pierz et al. | 701/213 |
| 2010/0107925 A1 | 5/2010 | Bounds | |
| 2010/0131185 A1 | 5/2010 | Morris et al. | |
| 2011/0098925 A1 | 4/2011 | Robinson | |
| 2012/0192756 A1 | 8/2012 | Miller et al. | |
| 2013/0096739 A1 * | 4/2013 | Landes et al. | 701/19 |

OTHER PUBLICATIONS

International Application No. PCT/US 12/60786, PCT Written Opinion of the International Searching Authority, mailed Jan. 7, 2013.

* cited by examiner

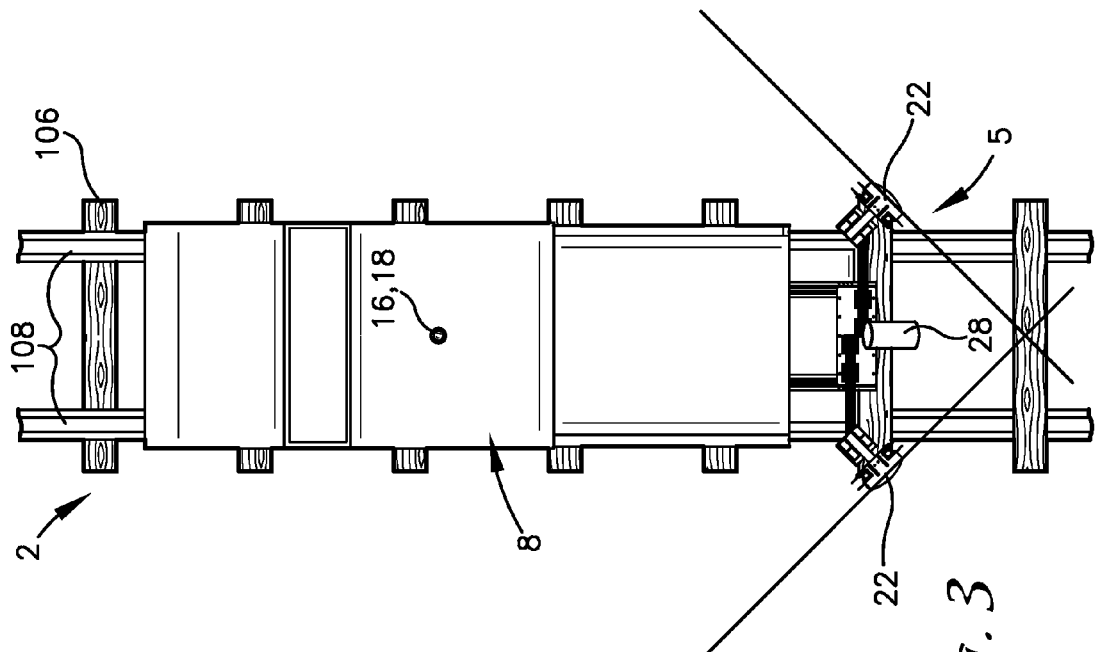
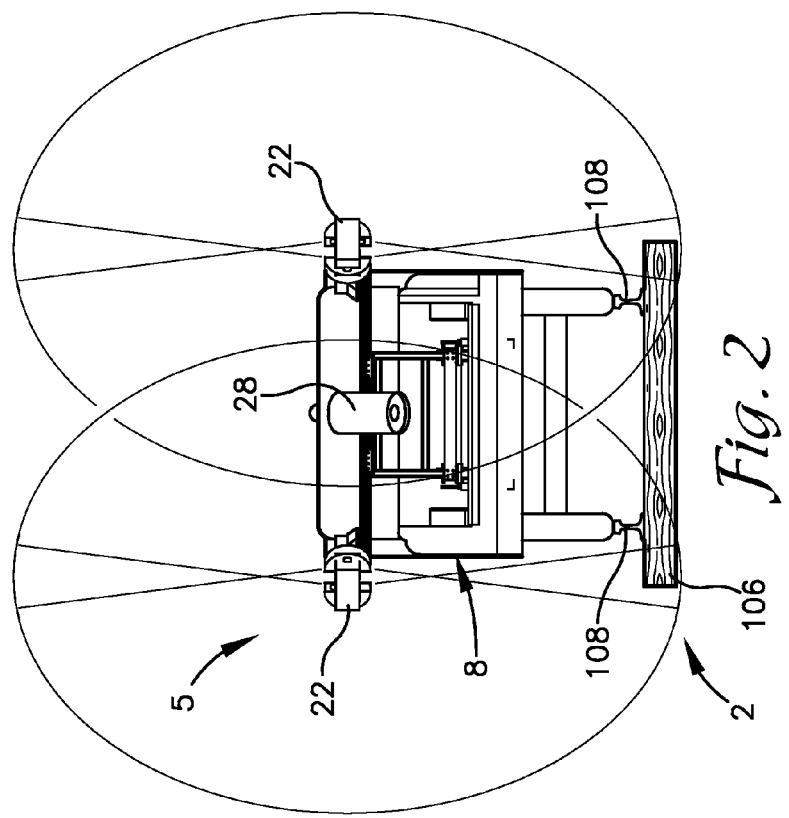

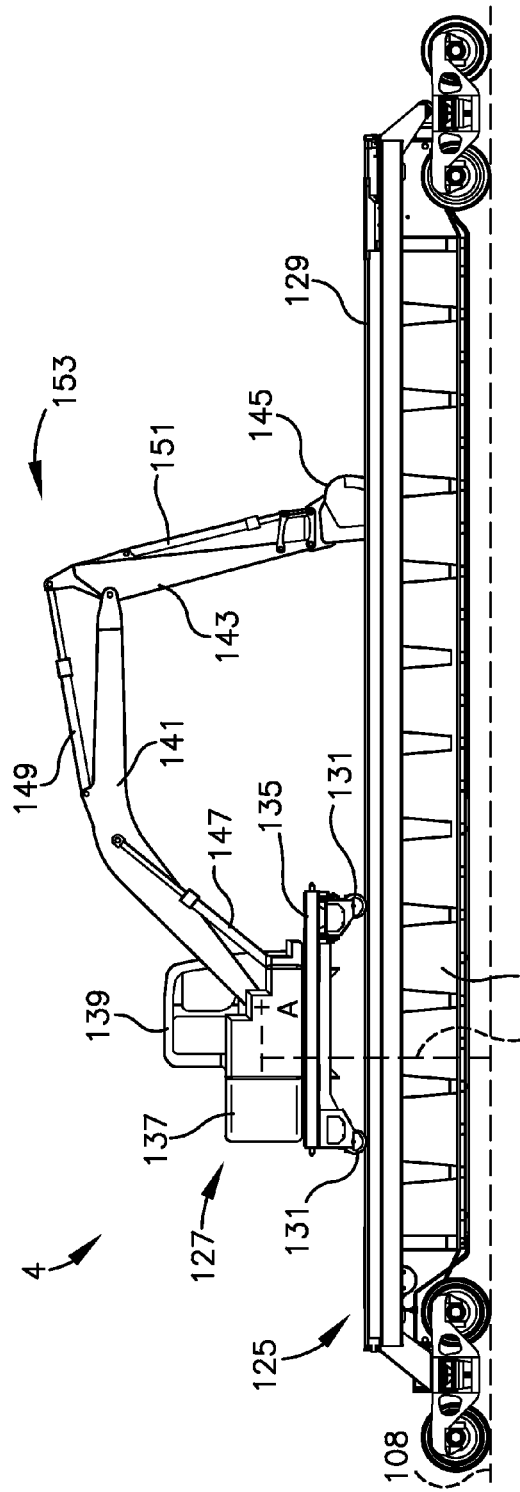
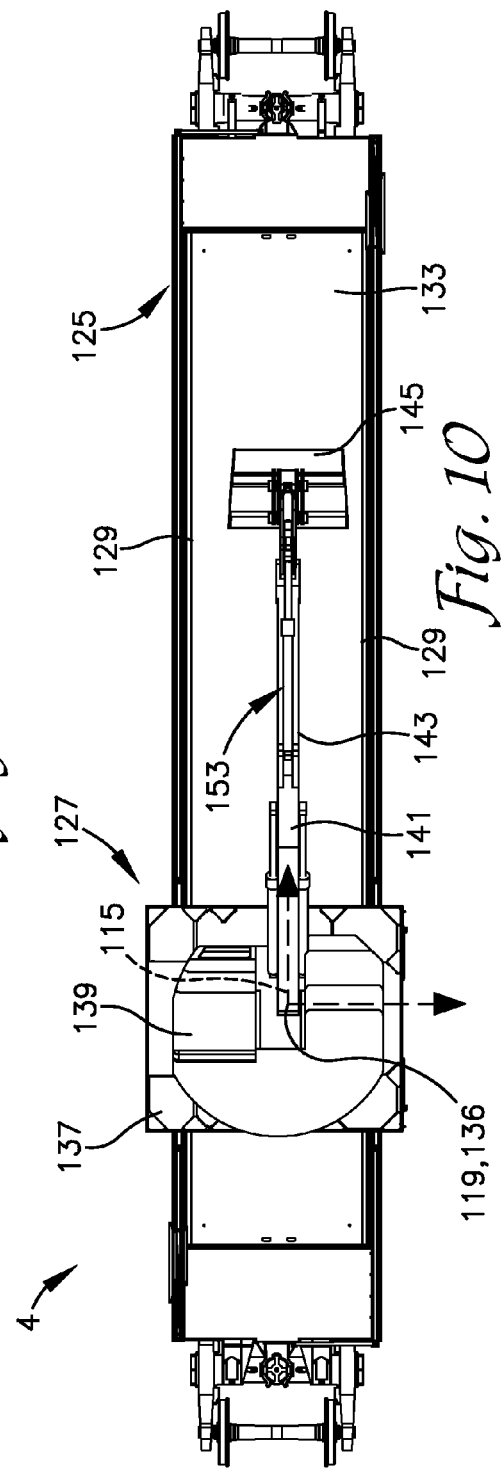

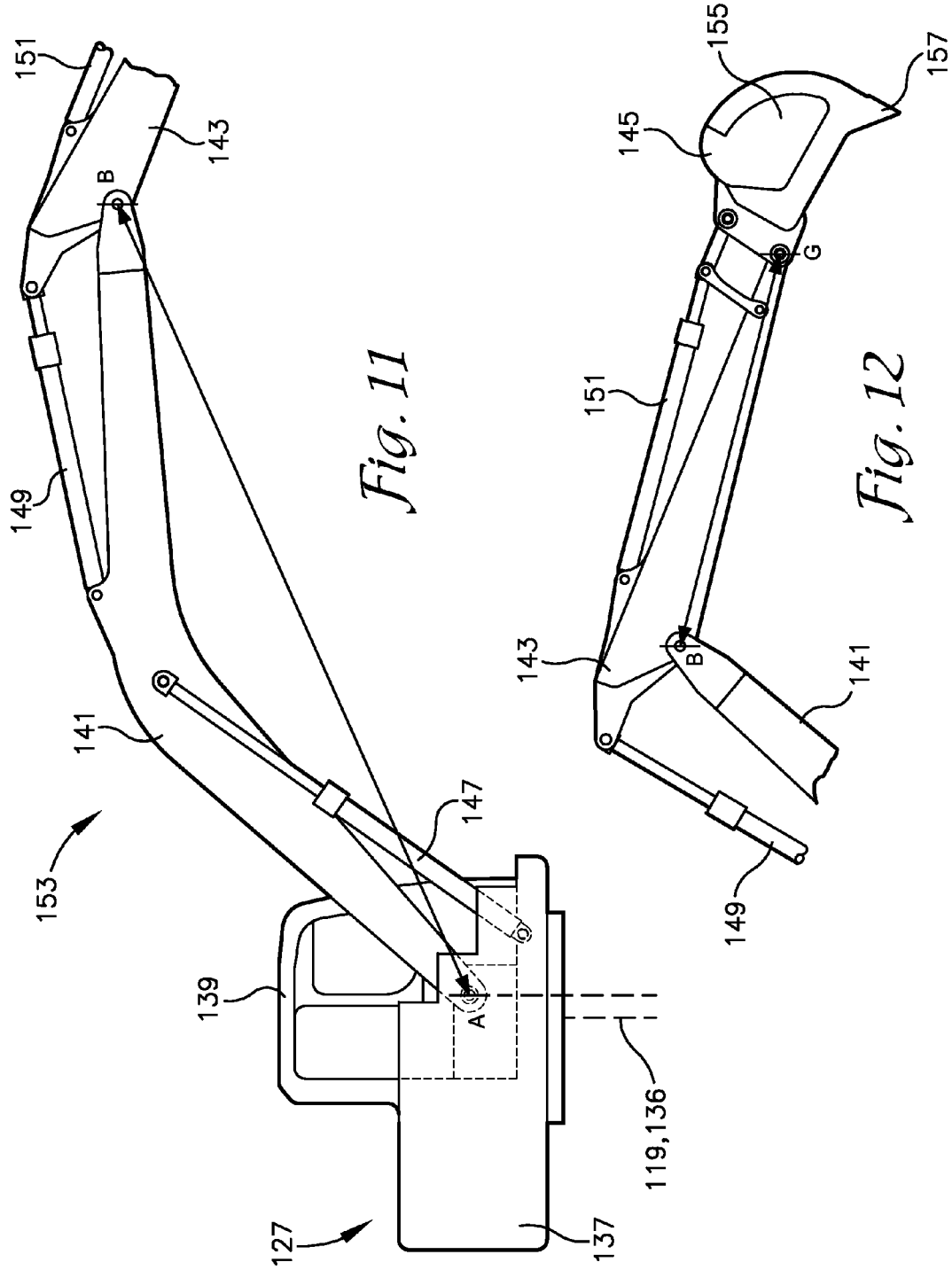

AUTOMATED TRACK SURVEYING AND DITCHING

CROSS-REFERENCE TO RELATED APPLICATION

This application claims priority from U.S. Provisional Application, Ser. No. 61/605,307 filed Mar. 1, 2012 for AUTOMATED TRACK SURVEYING AND DITCHING, the disclosure of which is incorporated herein by reference.

BACKGROUND OF THE INVENTION

1. Field of the Invention

This invention relates generally to railroad maintenance and, more particularly, to methods of surveying railroad track beds in conjunction with position recording and performing track maintenance operations, such as maintenance of drainage ditching along the track bed, based on the survey results.

2. Background & Description of the Related Art

Conventional railroads in the United States and elsewhere are formed by a compacted subgrade, a bed of gravel ballast, wooden cross-ties positioned upon and within the ballast, and parallel steel rails secured to the ties. Variations of construction occur at road and bridge crossings, at switch points, and in other circumstances. The ballast beneath and between the ties stabilizes the positions of the ties, keeps the rails level, and provides some cushioning of the composite structure for loads imposed by rail traffic. Ballast in good condition is porous which allows rainwater and snow melt to drain through it and away from the railroad. This is desirable because standing water in the ballast can cause deterioration of the track and ties, the ballast, and the subgrade.

Water from the ballast needs to be drained away from the subgrade. To accomplish this, a ditch may be formed along one or both sides of a railway. The ditch line should be sloped slightly, to positively drain water toward a drainage point, which may be a natural body of water, a drainage structure such as a culvert, or the like. If the ditch is not constructed properly, water can pool up or drain away to an unforeseen location, possibly causing undesired effects such as erosion or the like.

Conventional ditch construction and maintenance can be laborious, often requiring surveying type measurements to maintain an accurate pitch of the ditch line. Although initial ditch construction can be automated, such as by the use of machinery similar to those shown in U.S. Pat. Nos. 4,723,898 and 4,736,534, which are incorporated herein by reference, ditch maintenance may require not only removal of soil material but also the replacement of soil which has been eroded away.

Methods for automated surveying for ballast maintenance are known. Such methods often employ LIDAR (light detection and ranging) scanning of the railway along with concurrent recording of position coordinates, such as by GPS (global positioning system) or GNSS (global navigation satellite system), IMU (inertial measurement unit), wheel encoders, or combinations thereof. Such automated surveying methods typically generate graphic ballast profiles which can be used to determine amounts of ballast needed to replace ballast which has been dislodged by vibrations, weather, and the like. Methods for spreading railroad ballast with location control based on data received from position coordinate systems are disclosed in U.S. Pat. Nos. 6,526,339 and 7,152,347, which are incorporated herein by reference.

SUMMARY OF THE INVENTION

The present invention provides embodiments of a method for automatically surveying a section of a railway to capture data that represent planar snapshots of the railway which are associated with position coordinates along the railway. The data can be processed to determine amounts of soil to be removed or replaced which are keyed to the position coordinates of track locations.

In an embodiment of the method, a survey vehicle is moved along the railway as a position coordinate system determines position coordinates of the vehicle and enters them into a survey computer system. As the survey vehicle moves along the railway, an optical scanning system scans the track at regular intervals to gather optical data points which are stored in the survey computer along with position coordinates and time stamps. At the same time, photographic images are recorded along with position coordinates and stored in the survey computer. While these operations are occurring, locations of drainage points may entered into the survey computer.

The optical data points are subsequently processed to derive localized ditch profiles which are compared to ditch templates representing a desired position, shape, and depth of the ditching at the specific location. Area differences are accumulated along designated units of length of the railway to determine unit volumes of soil or soil units to be excavated or deposited to achieve the desired ditch profile. In an embodiment of the method, the ditch profiles are graphically overlaid on the ditch templates corresponding to the location thereof to create ditch overlays which are graphic images of the amount of material needed to be excavated or deposited referenced to the position coordinates associated with the ditch profiles. The ditch templates are created to pitch the ditch line toward a local drainage point.

The soil units are then analyzed, by a computer, by an analyst, or both to determine if the soil units appear to be appropriate and to detect any anomalies in the soil units. If such anomalous soil units are detected, images corresponding to the track location are reviewed to determine the possible reason for the anomalous soil units. If necessary, the anomalous soil units can be adjusted to more appropriate amounts. Once the anomalous soil units are adjusted, the ditch overlays for the locations having anomalous soils are also adjusted. The set of ditch overlays can then be entered into a computer system on an excavator which is provided with position coordinate systems. When the excavator is positioned along the section of railway for maintenance of the ditch, the ditch overlay associated with the current location can be retrieved and viewed by the operator for guidance in excavating or replacing soil in the ditch to achieve the desired profile at that location.

The survey vehicle may, for example, be a road vehicle such as a pick-up truck equipped with retractable flanged wheels for traveling on rails, such as a Hy-Rail equipped vehicle (trademark of Harsco Technologies LLC). The position coordinate system may include an IMU, a GPS receiver including a GPS antenna, and a wheel encoder. The IMU generally includes accelerometers and gyroscopes which detect accelerations along and rotations about specific axes and convey data representing such accelerations and rotations to the survey computer system which then determines position coordinates of the current location and orientation relative to a previous reference location. The GPS receiver continually determines position coordinates of the GPS antenna and stores the position data in the survey computer. Data from the GPS receiver may be used to regularly establish a new reference location for the IMU. The wheel encoder device determines the distance traveled by the survey vehicle along the railway and stores such position data in the survey computer. Position data from the IMU, the GPS receiver, and the wheel encoder can be compared for accuracy. Additionally, if the GPS is unable to receive signals because of terrain or intervening structures, the position of the survey vehicle can still be logged by the IMU and the wheel encoder until the GPS receiver is again able to lock onto signals from the GPS satellites.

The optical scanning system may be a laser scanning system, also referred to as a LIDAR system. A LIDAR scanning system operates somewhat like a radar system in that it activates a laser beam and measures the time of reflection back to a sensor and converts the return time to a distance. The return time or distance is recorded along with azimuth and elevation angles of the laser beam, the current position coordinates, and a time stamp. The scene may be scanned in a rectangular raster pattern, that is vertically stacked horizontal lines or horizontally stacked vertical lines or in a radial manner. The results of a complete scan of a given scene provide a set of data points representing a coarse three dimensional image of the scene. The data points can be processed using trigonometric operations or other methods to detect only data points in a single vertical plane transverse to the track, with known position coordinates. Data points within the plane representing a survey profile of the ditch at the recorded position coordinates can then be extracted. Systems for scanning railways to obtain ballast profiles are known in the art, such as described in U.S. Pat. No. 6,976,324, which is incorporated herein by reference. In an embodiment of the invention, LIDAR scanner units are mounted on the survey vehicle in spaced apart relation. Data points from the scanner units can be processed by software to "stitch" common data points together to form the vertical plane and ditch survey profile.

As the survey vehicle is being moved along the track, photographic images are also being recorded along with position coordinates. The photographic imaging can be conventional digital video frames which can later be displayed in motion to analyze an area of the railway or which can be slowed or stopped for more detailed analysis. In addition to the recording of conventional video images, an embodiment of the invention also records digital panoramic images along with position coordinates at intervals along the railway. The panoramic images may be quasi-spherical panoramic images similar to the types of images displayed in Street View on Google Maps (trademarks of Google, Inc. maps.google.com) which are formatted for viewing using an internet browser. The viewer can pan the spherical image around a full 360° and tilt up and down for an extensive view of scene. Camera systems for recording such spherical panoramic images are commercially available and are similar to that described in U.S. Pat. No. 5,703,604, which is incorporated herein by reference.

An operator of the survey crew may use a logging terminal, such as another computer or computer device interfaced to survey computer system, to mark end points of drainage points, such as streams and drainage structures such as culverts, canals, and the like. The end points of the drainage points are recorded by logging the position coordinates of the survey vehicle at the time the end points are marked and may include time stamps.

When the survey is complete, the collected data may be processed to refine the position coordinates to enhance the accuracy of the survey. Afterward, the optical scan data is processed to determine the area differences between standard ditch templates and the surveyed ditch profiles at corresponding position coordinates. The ditch templates may vary according to the contour of the land on which the railway right of way is located. It is desirable to provide a pitch to the ditch which will positively drain water away from the track bed at higher locations toward drainage points. For this reason, the depth of the ditch from template to template may vary to accomplish this purpose. The ditch templates may be created prior to conducting the survey.

The ditch profiles are overlaid on the corresponding ditch templates to determine areas of difference therebetween. The area differences may be averaged along a unit length of the track and multiplied by the unit length to derive soil excavation or deposition volumes or soil units. The position data may mark the beginning and end of a unit length of the section of railway. The ditch overlays are compiled into a ditch data file along with associated position coordinates. The ditch data file also includes data representing the ends of drainage points.

Before the ditch data file is entered into an excavator computer, the data is processed or reviewed, or both, for anomalies in the soil units. For example, data indicating excavation or deposition of excessive amounts of soil may indicate an anomaly in the shape of the substructure of the railway. When anomalies are detected or discovered, the photographic images for corresponding sections of the railway section may be reviewed to determine if adjustments in the ditch overlays may be necessary.

Once all necessary adjustments to the ditch overlays have been made, the adjusted ditch data file can be entered into the excavator computer for display to the excavator operator in associated with position coordinates of the excavator apparatus as guidance to the operator in excavation of local areas of the ditch or depositing soil therein to achieve the desired ditch profile.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 2 is a diagrammatic rear elevational view of the survey vehicle for use in the automated track surveying and ditch maintenance system.

FIG. 3 is a diagrammatic top plan view of the automated track surveying and ditch maintenance system.

FIG. 9 is a side elevational view of an embodiment of an excavator apparatus for use in the present invention.

FIG. 10 is a top plan view of the excavator apparatus.

FIGS. 11-15 are fragmentary side elevational views illustrating a plurality of pivot axes of an excavator arm and bucket of the excavator apparatus for remotely determining the position of portions of the excavator bucket.

DETAILED DESCRIPTION OF THE PREFERRED EMBODIMENTS

Figure 1:
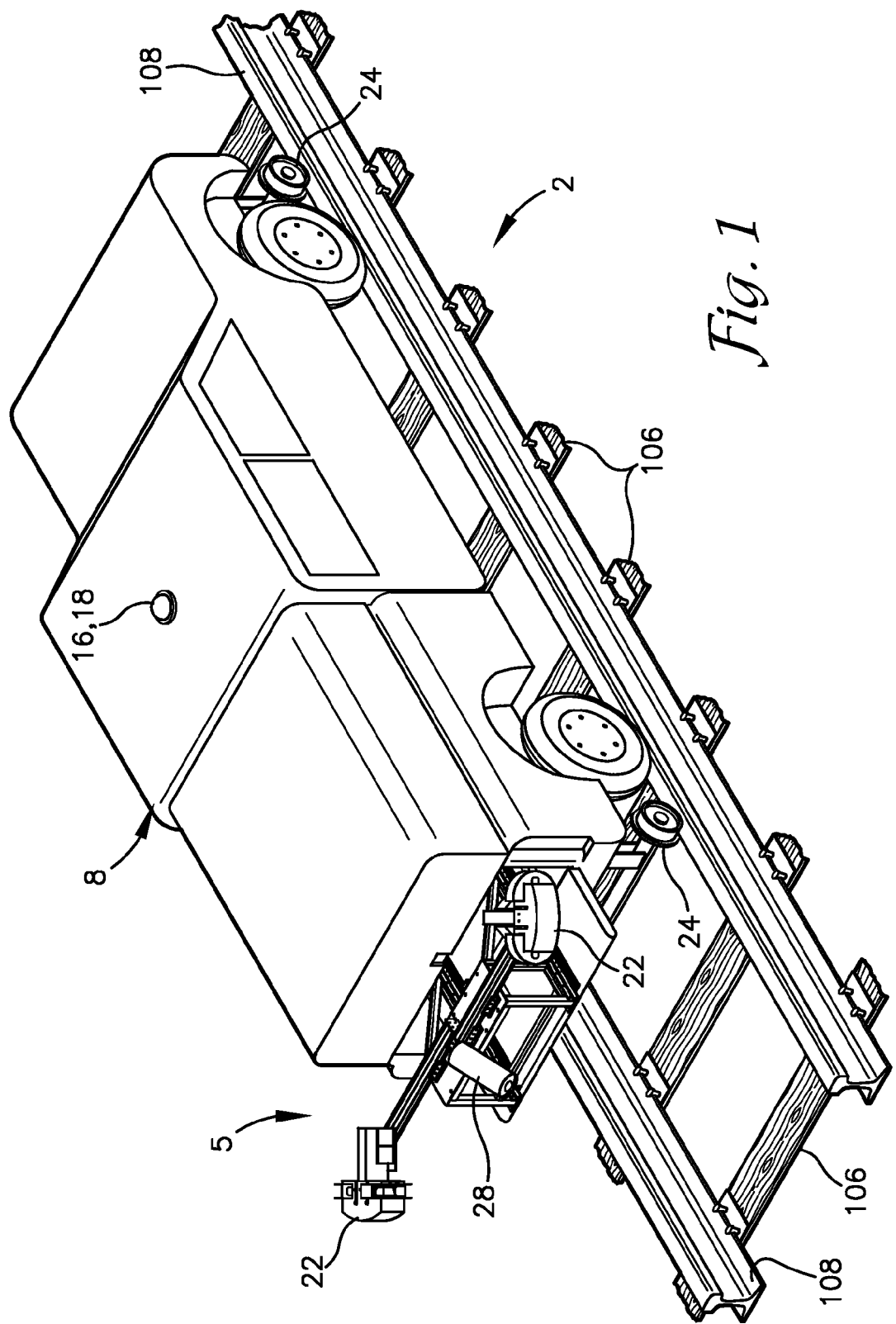
FIG. 1 is a diagrammatic perspective view of a survey vehicle for use in an automated track surveying and ditch maintenance system of the present invention.
Figure 4:
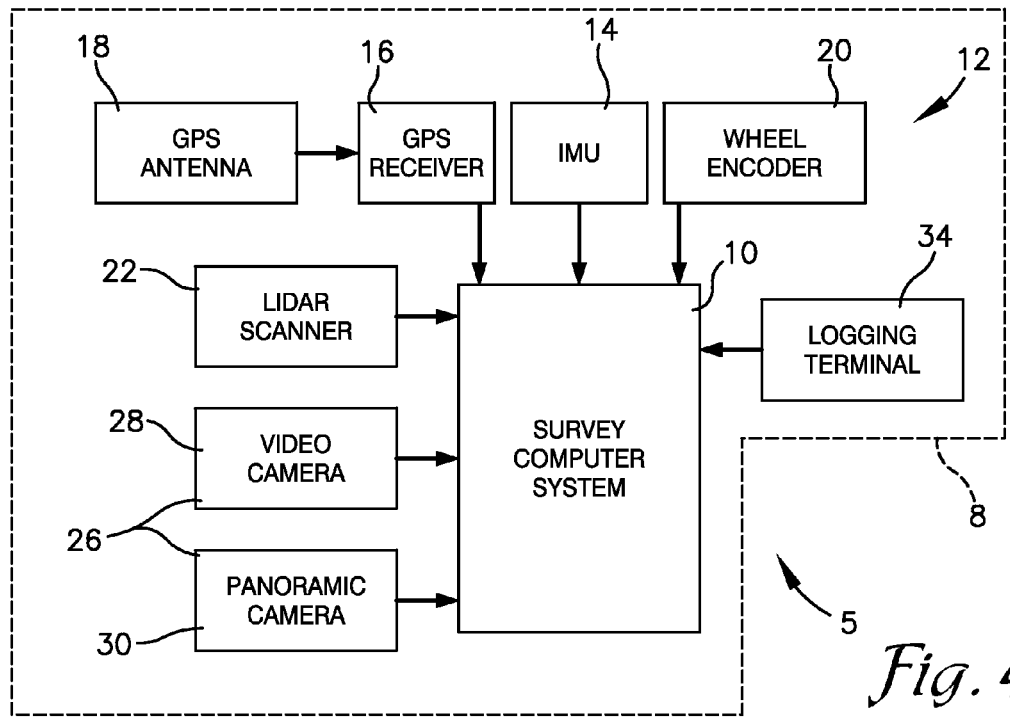
FIG. 4 is a block diagram showing principal components of an embodiment of a survey vehicle computer system for use in the automated track surveying and ditch maintenance system.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference number 1 (FIG. 6) generally designates an embodiment of an automated track surveying and ditching or ditch maintenance method according to the present invention. The method 1 generally includes optically scanning along intervals of a section of a railway 2 (FIGS. 7 and 8), deriving data sets representing the cross sectional shape of a ditch 3 at each interval, comparing the existing shape of the ditch with a shape which promotes needed drainage of the railway, and using the differences between the actual shape and the desired shape as guidance to the operator of an excavator apparatus 4 (FIGS. 5, 9, and 10) to remove or deposit soil to achieve the desired shaped of the ditch 3.

A ballast survey vehicle 8 (FIGS. 1-4) is equipped with ditching survey apparatus 5. The illustrated survey apparatus 5 includes a survey computer and data storage system 10 which may include one or more computers and may be referred to as the survey computer system 10. The survey apparatus 5 includes one or more position coordinate determining devices 12, such as an inertial measurement unit (IMU) 14 which is an instrument with sets of accelerometers and gyroscopes (not shown) which determine accelerations along and rotations about sets of axes and stores data representing such accelerations and rotations in the survey computer system 10. The computer 10 uses data from the IMU to determine a change in position and orientation relative to a reference position. The illustrated position coordinate determining devices 12 include a GPS receiver 16 having a GPS antenna 18 which determines position coordinates of the GPS antenna 18 by processing signals received from GPS satellites. The position data from the GPS receiver 16 can be used to periodically establish a new reference position for the IMU 14. The position coordinate determining devices 12 may also include a wheel encoder 20 engaged with a wheel of the survey vehicle 8. The IMU 14 and wheel encoder 20 may act as the primary position coordinate devices 12 if the GPS receiver 16 fails to lock onto sufficiently reliable GPS signals because of terrain, intervening structures, or for other reasons. The position coordinate devices 12 are interfaced to the survey computer system 10 and provide their position coordinate data thereto at regular intervals.

The ditching survey apparatus 5 includes an optical scanning device, such as LIDAR scanner devices 22. The illustrated LIDAR scanners 22 scan scenes of the railway section 2 at regular intervals by scanning a laser beam across or about the track scene in a rectangular or radial pattern, periodically activating the beam and measuring the time of arrival of a reflection from the beam, converting the reflection time to a distance, and storing distance data for each beam activation along with azimuth and elevation angles, current position coordinates, and a time stamp in an optical survey data file within the survey computer system 10. In an embodiment of the ditching survey apparatus 5, a pair of horizontally separated LIDAR scanner devices 22 are mounted on the survey vehicle 8 and perform independent scans of scenes of the railway section 2. The scanner devices 22 may be mounted so that one scanner scans from the left side of the track and over past the right side of the track while the other scanner scans from the right side of the track and over past the left side of the track. The scanned data can generally be stitched together by known software to create an image including data from both sides of the track and therebetween. The survey vehicle 8, as illustrated in FIGS. 1-3, may be a pickup truck equipped with retractable flanged wheels 24 to enable it to travel along the railway 2.

The ditching survey apparatus 5 includes image recording devices 26 which record images of scenes of the railway section at intervals therealong concurrent with the optical scanning by the LIDAR scanner device or devices 22. The illustrated image recording devices 26 include a digital video camera 28 and a digital panoramic camera 30. The digital video camera 28 records conventional digital video data, including digital motion picture frames as the survey vehicle 8 is moved along the railway section 2. The digital picture frames are associated with position coordinate data provided by the position coordinate devices 12. The digital video data is stored in the survey computer system 10 and can subsequently be replayed at the recorded rate or at slowed rates or stopped frames for detailed analysis of the environment of a particular location along the railway section 2. The illustrated digital panoramic camera 30 records data representing 360° quasi-spherical panoramic images of scenes of the railway section 2 at regular intervals therealong which are associated with position coordinate data provided by the position coordinate devices 12. The digital panoramic image data is stored in the survey computer system 10 and can subsequently be interactively viewed with internet browser type software to display 360° panoramic views of particular locations along the surveyed railway section 2.

The ditching survey apparatus 5 may include logging terminal 34 which is interfaced to the survey computer system 10 into which a survey operator riding in the survey vehicle 8 enters end points of drainage points along the railway section 2. The end points are defined by position coordinates current at the time of entry.

Figure 5:
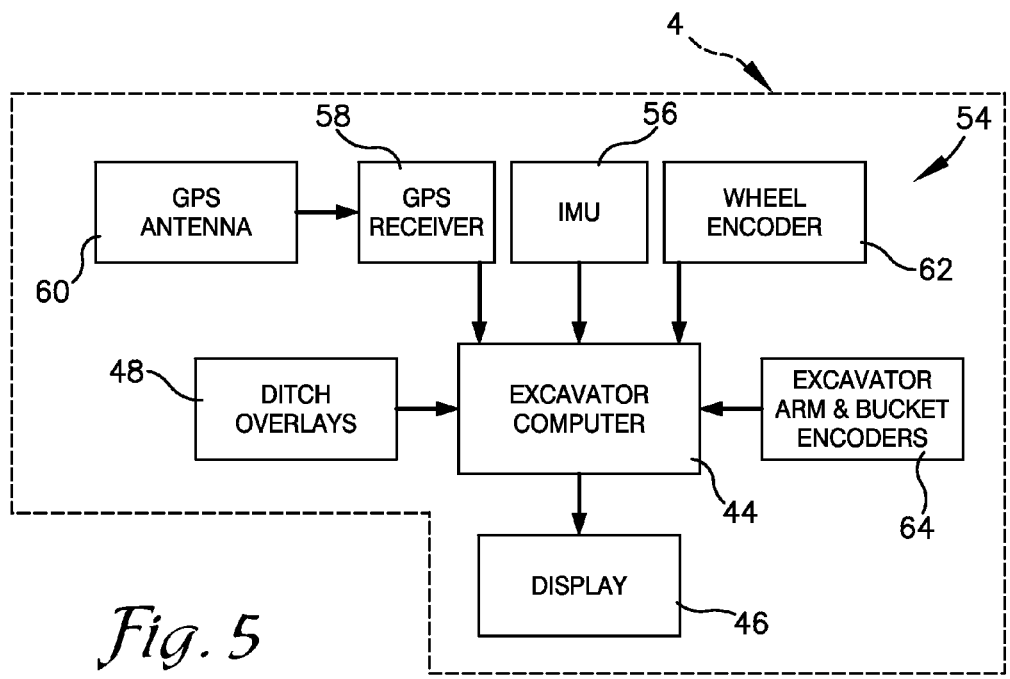
FIG. 5 is a block diagram showing principal components of an embodiment of an excavator computer system for use in the present invention.

Ditching data and corresponding position coordinates generated by the ditching survey apparatus 5 will be used by the operator of the excavator apparatus 4 (FIGS. 5, 9, and 10) for guidance in removing or excavating soil from the existing ditch 3 or depositing soil therein. Referring to FIG. 5, the illustrated excavator apparatus 4 has an excavator controller or computer 44 including a computer display 46 which is used by the excavator operator to display ditch overlays 48 which graphically illustrate the existing ditch profile at the current location along the railway 2 and the desired ditch template shape. Position coordinate devices 54 are interfaced to the excavator computer 44 and provide position coordinates of the excavator apparatus 4 thereto. The position of the excavator apparatus 4 can be referenced as a vertical axis of rotation of a portion of the excavator apparatus, as will be described further below. The position coordinate devices 54 may include an inertial measurement unit (IMU) 56, a GPS receiver 58 with a GPS antenna 60, and a wheel encoder 62. The excavator computer 44 has excavator arm and bucket encoders 64 interfaced thereto, as will be described further below.

Figure 6:
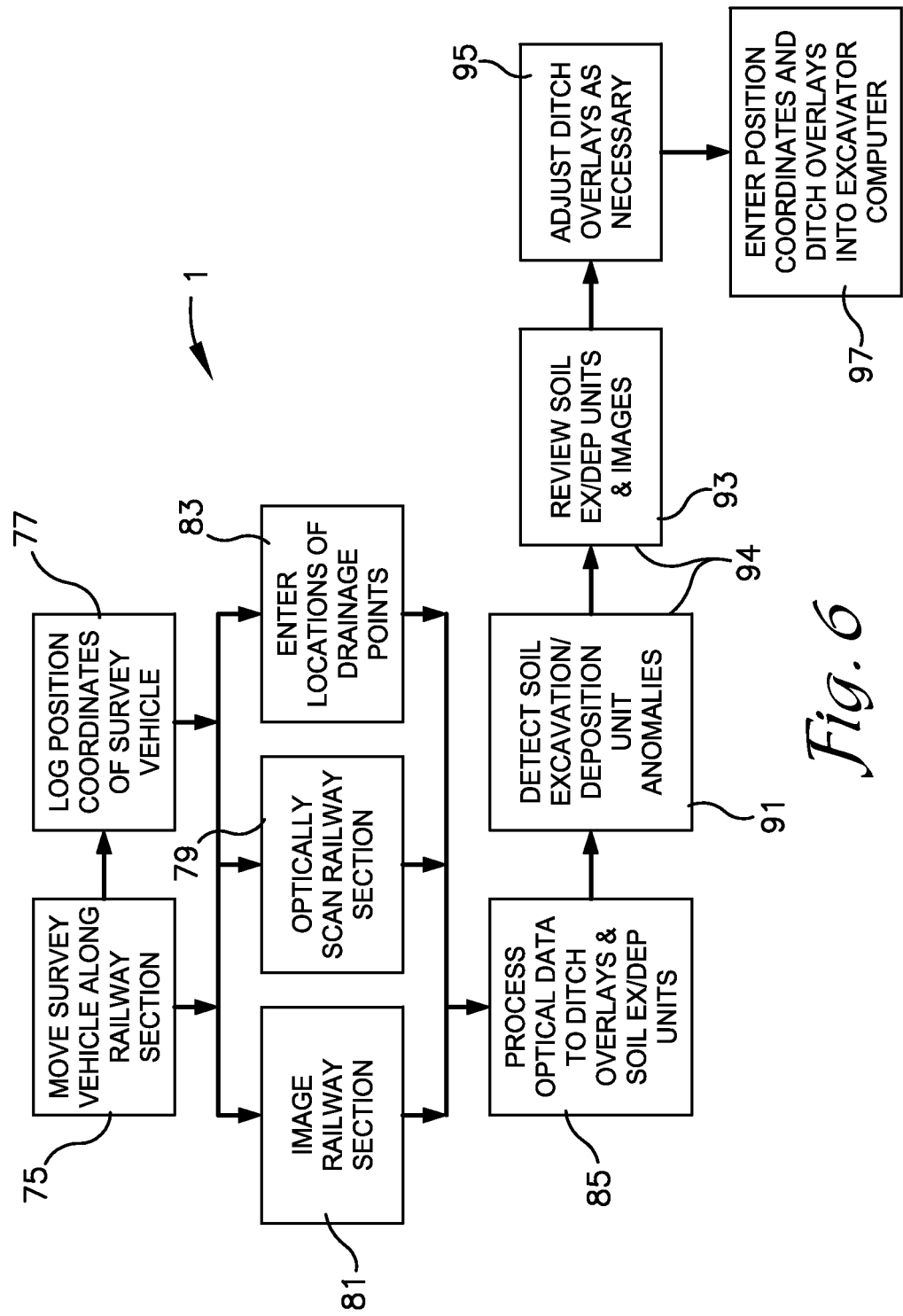
FIG. 6 is a flow diagram of principle steps in an embodiment of an automated track surveying and ditch maintenance method according to the present invention.

Referring to FIG. 6, in an embodiment of the automated track surveying and ditching method 1, the survey vehicle 8 is moved along a section of a railway 2 at step 75 while position coordinates are logged into the survey computer system 10 at step 77, using the IMU 14, the GPS receiver 16, and the wheel encoder 20. As the survey vehicle 8 is moved along the railway section, scenes of the railway section are optically scanned at regular intervals at step 79 by the LIDAR scanner device or devices 22, and optical data points are stored in an optical data file in the survey computer system 10 along with current position coordinates. As the optical scanning 79 is occurring, digital photographic images are recorded at step 81 by the video camera 28 and the panoramic camera 30 and stored in the survey computer system 10 along with current position coordinates. Finally, the end locations of drainage points are entered into the computer system 10 along with position coordinates, at step 83, such as by a survey operator using the logging terminal 34.

When a ditch survey run has been completed, the optical data file is processed at step 85 to derive ditch survey profiles 87 (FIG. 7) at intervals along the railway section 2. A survey profile 87 represents the shape of the ditch 3 at a vertical plane transverse to the track at a particular logged position along the railway section. The survey profile 87 is formed from a plurality of LIDAR data points extending across a vertical plane extending generally transverse to a longitudinal axis or center line of the track bed. The survey profile 87 is compared to a standard ballast template 89, which represents the desired shape of the ballast at the corresponding location, by overlaying the profile 87 with a ditch template 89 for the corresponding location, to form a ditch overlay 48. The shape of a ditch template 89 may vary depending on the local circumstances associated with a particular portion of the railway, such as the pitch of a ditch line required to positively drain runoff toward a local drainage point, or the like. The overlays 48 can be further processed to determine volume or weight units of soil, or soil units, to be excavated or deposited in the ditch 3 corresponding to selected intervals along the railway 2. The ditch overlays 48 and soil units are stored in a ditch data file. The optical data file may also be processed to refine the accuracy of the position coordinate data prior to deriving the ditch overlays 48 and soil units.

The ditch data file may be processed at step 91 to detect anomalies in the soil units, and/or it may be reviewed by an analyst to discover such anomalies. Anomalies in the soil units are values which are significantly different from expected ranges. If anomalous soil units are detected or discovered, images corresponding geographically to the unit weights are reviewed at step 93 to determine the environment of the railway in the vicinity of the railway unit length. The processing step 91 and reviewing step 93 form a data validation procedure 94 (FIGS. 6 and 16), which will be described in greater detail below. The images reviewed are the images recorded at step 81. If necessary, anomalies in the ditch overlays 48 can be adjusted at step 95 to provide more appropriate shapes as determined by the image review at step 93. When all the required adjustments have been made, the ditch data file, including the ditch overlays 48 with associated position data, is ready for entering into the excavator computer 44 at step 97. The ditch overlays 48 are displayed on the excavator computer display 46 and used by the operator of the excavator apparatus 4 as a guide to shaping the existing shape of the ditch 3 at a particular location to the desired shape.

Figure 7:
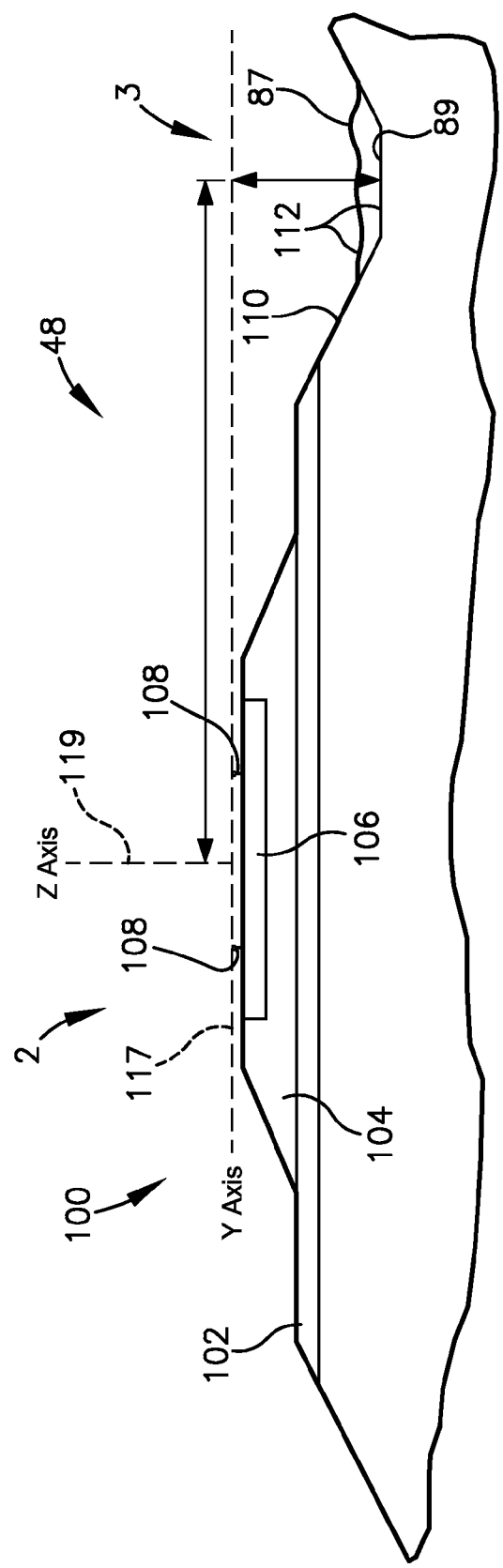
FIG. 7 is a diagrammatic view of an embodiment of a cross sectional ditch overlay according to the present invention, formed by a ditch profile and a ditch template to show the amount of soil material needed to be removed from an existing ditch to contour the ditch to the ditch template.
Figure 8:
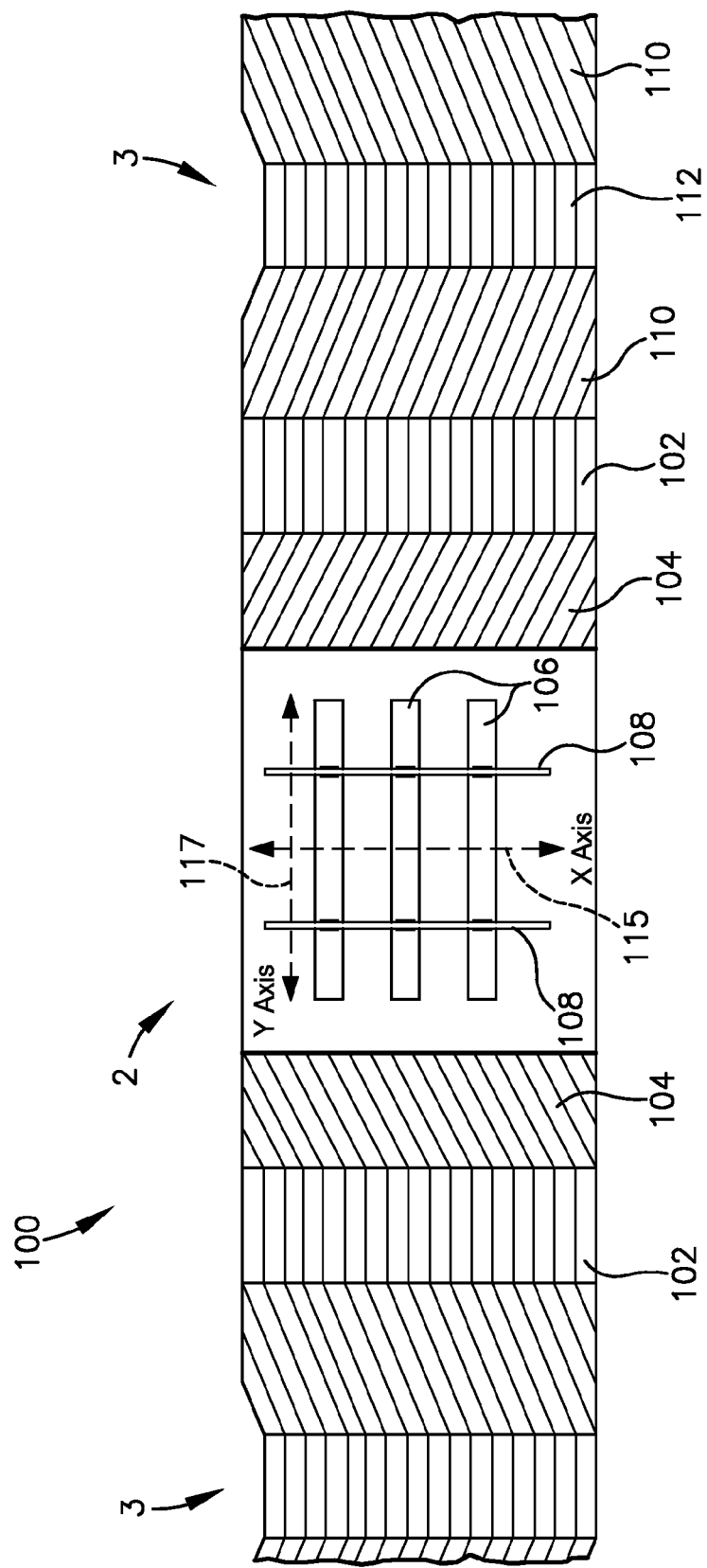
FIG. 8 is a fragmentary diagrammatic top plan view of a short section of a railway and shows reference axes of the railway and components of the track bed and ditch.
Figure 14:
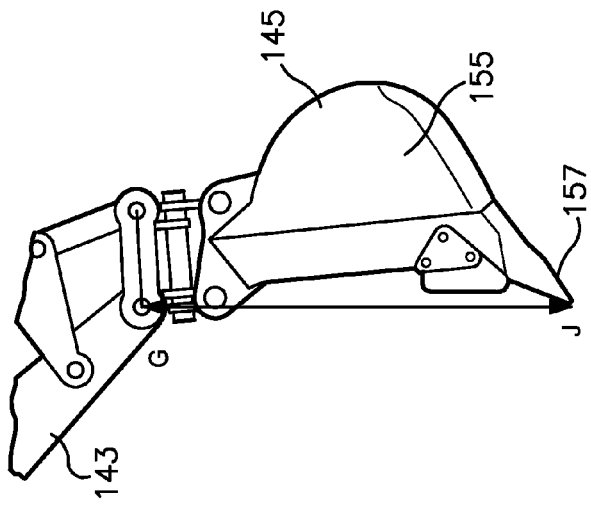
Figure 15:
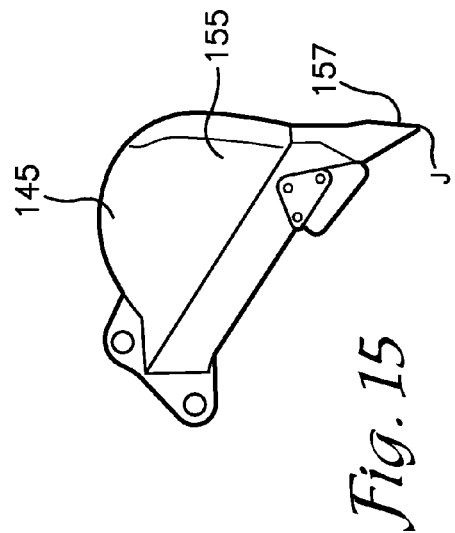
Figure 13:
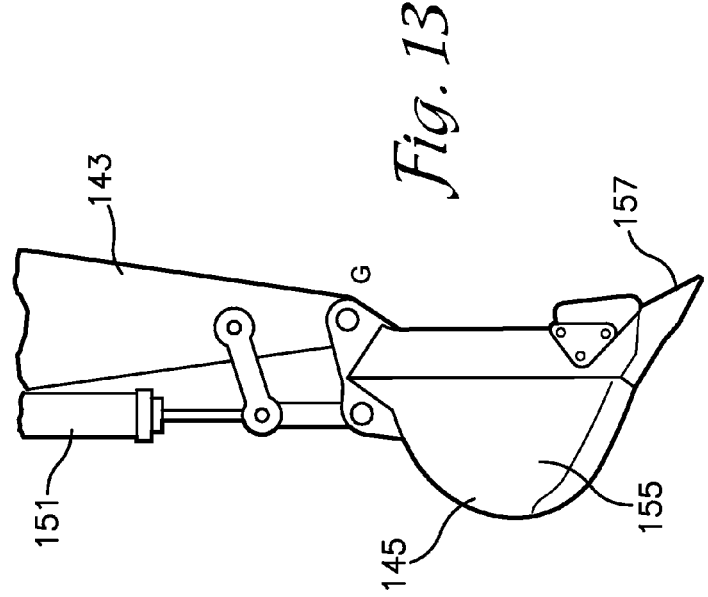

FIGS. 7 and 8 diagrammatically illustrate an exemplary section of a railway 2 and coordinate references relating thereto. The illustrated track structure 100 includes a sub-grade or sub-ballast 102 on which a bed of ballast 104 is disposed. Railroad ties 106 are imbedded in the ballast 104 and support the parallel rails 108. The ditch 3 is formed by sloped ditch sides 110 which line opposite sides of a ditch bottom 112. A center line between inboard or gauge sides of top surfaces of the rails 108 forms an X axis 115. A Y axis 117 extends transversely through the top surfaces of the rails 108 perpendicular to and intersecting the X axis 115. A Z axis 119 is defined at the intersection of the Y axis 117 and the X axis 115 and, on a straight section of the railway 2, is vertical. Transverse distances are referenced from the X axis 115 in a direction parallel to the Y axis 117. Vertical distances are referenced to the Y axis 117 in a direction parallel to the Z axis 119. FIG. 7 is a ditch overlay 48 illustrating a ditch profile 87 of an existing ditch 3 combined with a ditch template 89 which locally optimizes the ditch 3 for required drainage functionality.

FIGS. 9 and 10 illustrate an embodiment of an excavator apparatus 4 which may be employed in the ditching method 1 of the present invention. The illustrated excavator apparatus 4 includes a railway car 125 having a crawler type service vehicle or excavator 127 positioned thereon. The railway car 125 is a shallow gondola type car having crawler rails 129 positioned on top of side walls thereof. The vehicle 127 has flanged wheels 131 which engage the rails 129 to enable movement therealong. At least one pair of the wheels 131 are driven to propel the vehicle 127 along the rails 129. The car 125 may be one of a group of similar cars forming a "consist" (not shown) which may include a type of locomotive (not shown) to propel the cars 125 along the railway 2. In an embodiment of the excavator apparatus 4, such a locomotive is provided at each end of the consist of cars 100. Ends of the rails 129 of the consist are in such proximity that the service vehicle 127 can travel from one car to the next. The car 125 has a shallow hopper 133 to receive soil removed from the ditch 3 and from which soil may be obtained to deposit into a ditch 3 to raise the level of the bottom 112 of a portion of the ditch 3. Additional details of an excavator apparatus similar to the apparatus 4 can be found in U.S. Published Application No. 2003/0205162, which is incorporated herein by reference.

The illustrated excavator 127 includes an excavator frame 135 on which the wheels 131 are journaled and a boom chassis or excavator chassis 137 including an operator's cab 139 which is pivotally mounted on the frame 135 for pivoting about a generally vertical chassis axis 136 which, in the method 1, corresponds to the Z axis 119. The vertical axis 119/136 may function as a position reference for the excavator apparatus 4 and may be offset from the excavator GPS antenna 60. The excavator 127 includes motors (not shown) for propelling the drive wheels 131 and for rotating the chassis 137 relative to the frame 135. The excavator 127 includes a lift boom 141 pivotally connected to the chassis 137 at a pivot A (FIG. 11) and an arm 143 pivotally connected to an outer end of the boom 141 at a pivot B. A bucket assembly 145 is pivotally connected to an outer end of the arm 143 at a pivot G (FIG. 12). The illustrated boom 141 has an angled shape and is pivoted relative to the chassis 137 by a pair of boom cylinders 147 pivotally connected between the chassis 137 and the boom 141. The arm 143 is pivoted relative to the boom 141 by an arm cylinder 149 pivotally connected between the boom 141 and the arm 143. The bucket assembly 145 is pivoted relative to the arm 143 by a bucket tilt cylinder 151. Preferably, the bucket assembly 145 can also be twisted relative to the arm 143 by a twist motor (not shown). The boom 141, arm 143, bucket assembly 145, and the cylinders 147-151 form a bucket articulation assembly 153. The illustrated bucket assembly 145 includes a closed sided scoop 155 and bucket teeth 157 extending from the scoop 155.

Referring to FIGS. 11-15, the pivot A between the boom 141 and the chassis 137 is located at a measurable and known distance from the chassis axis 136; the pivot B between the arm 143 and the boom 141 is located at a measurable and known distance from the pivot A; the pivot G between the bucket assembly 145 and the arm 143 is at a measurable and known distance from the pivot B; and the tips J of the bucket teeth 157 are at a measurable and known distance from the pivot G. Each of the pivots A, B, and G and at the chassis axis 136 is provided with one of the arm and bucket encoders 64 which determine the angular orientation of the elements joined at such pivots. In addition, the height H (FIG. 9) of the pivot A above the top of the rails 108 is measurable and known. Height H, also corresponds to the vertical position of pivot A along the Z-axis 119 above the Y-axis 117 or the plane defined by the X-axis 115 and Y-axis 117. With the measured and known distances between the pivots entered into the excavator computer 44 and the current angular values of the pivots communicated to the computer 44, the current transverse and vertical position of the tips J of the bucket teeth 157 can be determined by the computer 44 using trigonometric operations. Such transverse and vertical positions of the tips J may be displayed graphically and/or numerically on the computer display 46 to guide the excavator operator in shaping local portions of the ditch 3 to the required template 89 associated with the current position coordinates.

The transverse position of the tips J relative to or along the Y-axis 117 is determined with reference to or from the X-axis 115 or the Z-axis 119 or from the vertical plane defined by the intersection of the X-axis 115 and the Z-axis 119. The vertical position of the tips J relative to or along the Z-axis 119 is determined with reference to or from the Y-axis 117 or the X-axis 115 or from the plane defined by the X-axis 115 and the Y-axis 117. The position coordinates or x, y, and z coordinates are all measured from the intersections of the X, Y, and Z axes 115, 117, and 119. With the Z-axis 119 corresponding to the chassis axis 136 extending vertically through the excavator 127, the Y-axis 117 is then determined by the position of the excavator vehicle 127 along the railway rails 108, which then also establishes the X-axis 115 as the center line parallel to the sides of the rails 108 and perpendicular to the Y-axis.

Figure 16:
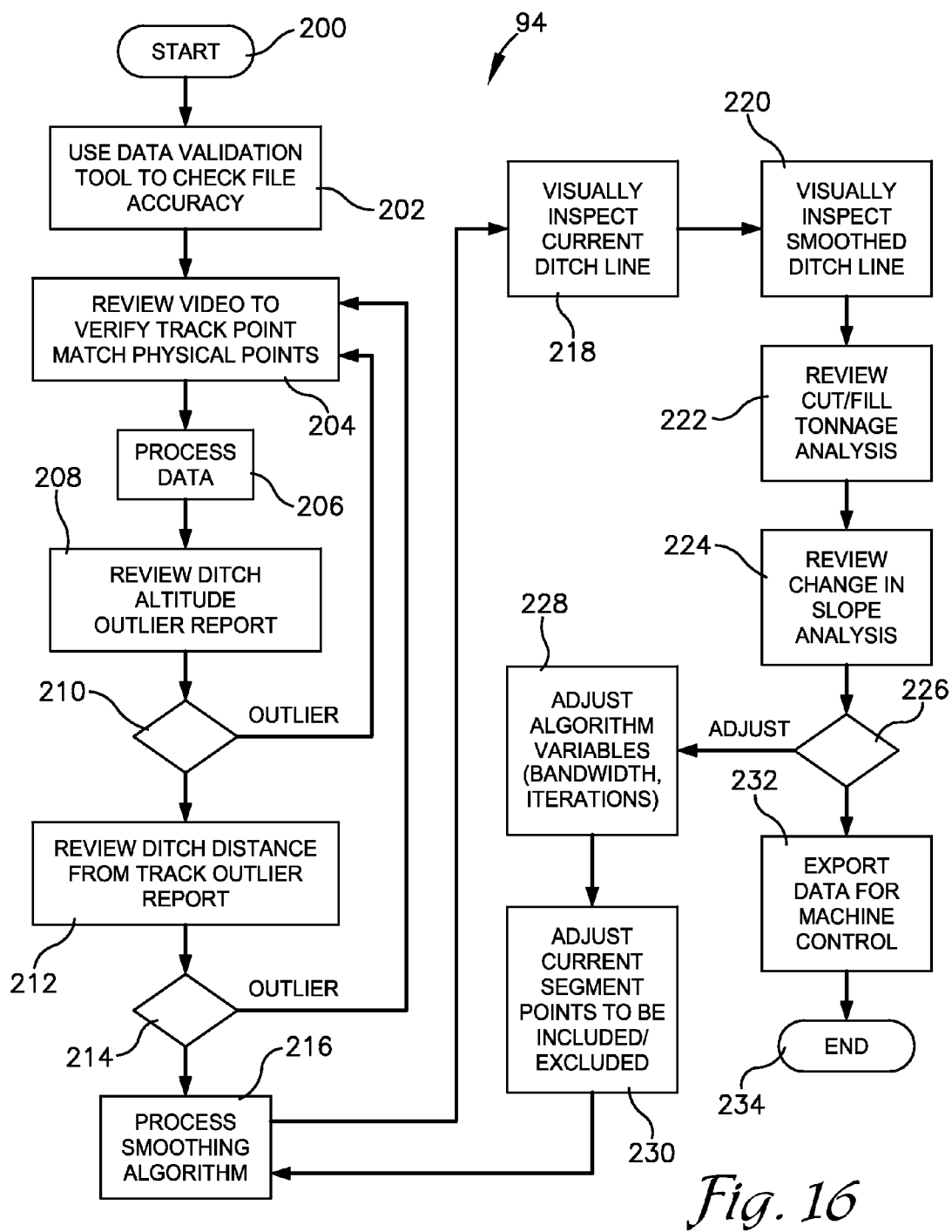
FIG. 16 is a flow diagram illustrating a data validation procedure according to the present invention.

FIG. 16 illustrates a data validation procedure 94 according to the present invention. At a start 200 of the procedure 94, a data validation tool or software is used at step 202 to check the accuracy of the file of ditch overlays 48. At step 204, the video and image data is reviewed to verify "track point match physical points". At step 206, the ditch overlay 48 data is processed to find outliers, that is, values out of set ranges. Such outliers are recorded in outlier reports. At step 208, a ditch altitude outlier report is reviewed. Similarly, at step 212, a ditch distance from the track outlier report is reviewed. Outliers in either ditch altitude or ditch transverse distance from the track found at steps 210 or 214 cause the procedure to branch back to step 204 for visual review. The outlier values can be adjusted to fall within the set ranges, or can be left as is, based on review of the image data in step 204. When all the outliers have been adjusted, a process smoothing algorithm is run at step 216 to create a smoothed ditch line from a high location along the track to a drainage location. At step 218, the current ditch line, or ditch line prior to smoothing, is visually inspected using the image data. Similarly, at step 220, the smoothed ditch line is visually inspected. At step 222, the cut/fill tonnage analysis along the track is reviewed, while the change in slope analysis is reviewed at step 224. If adjustments are needed at step 226, the algorithm variables, such as bandwidth and iterations, are adjusted at step 228, and the current segment points to be included or excluded are adjusted at step 230. The process smoothing algorithm 216 is repeated, followed by steps 218, 220, 222, 224, and 226 until no further adjustments are required. When no further adjustments are needed, the data is exported to the excavator computer 44 for use on the excavator apparatus 4 at step 232, and the data validation procedure 94 ends at step 234.

With the data stored on excavator computer 44, an excavator apparatus 4 including a railway car 125 and excavator 127 is moved along a section of railway 2 to a first selected location to begin ditch maintenance. In one embodiment, the chassis axis 136 is selected as the Z-axis 119 at the first selected location with the X-axis 115 and Y-axis 117 at the first selected location being referenced from the Z-axis 119 at the first location. A ditch overlay 48 corresponding to the interval aligned with the Y-axis 117 at the first selected location is displayed on the display 46 when the excavator boom 141, arm 143 and bucket assembly 145 are extended generally perpendicular to the railway car 125 at the first selected location and along the Y-axis 117. The excavator 127 may then be operated either manually or automatically by the excavator computer 44 to excavate or deposit soil as needed to eliminate differences between the ditch templates 89 and the ditch profiles 87 at the intervals accessible with the bucket 145 of the excavator from the first selected location. As the excavator chassis 137 pivots and the boom 141 and arm 143 are pivotally adjusted to reach sections of the ditch in front of and behind the Y-axis 117 at the first selected location, the ditch overlay 48 displayed on display 46 will include the ditch template 89 and ditch profile 87 associated with the Y-axis 117 extending through the bucket assembly 145 at the position offset from the Y-axis 117 at the first selected location.

Once the operator or controller has operated the excavator to modify the ditch profile 87 to correspond to the ditch templates 89 in the area that can be reasonably reached by the excavator bucket assembly 145 from the first selected location, the excavator 127 is moved or re-positioned along the railway car 125 to a second selected location, such that the chassis axis 136 moves and is then associated with a new Z-axis 119. The excavator 127 is then operated from the second selected location to excavate or deposit soil as needed to eliminate differences between the ditch templates 89 and the ditch profiles 87 at intervals accessible with the bucket 145 of the excavator 127 at the second selected location. This process typically starts with the excavator 127 located at a first end of a consist of railway cars 125 and the excavator 127 moving incrementally to the opposite end of the consist. Once the excavator 127 reaches the opposite end of the consist, the entire consist is moved farther along the railway 2 until the first end of the consist is located near where the opposite end of the consist was located prior to repositioning of the consist. The excavator 127 moves back to the first end of the consist and then incrementally moves back to the opposite end while performing the previously described ditch maintenance steps.

In a preferred embodiment it is foreseen that the excavator controller 44 will be programmed to control the operation of the excavator 127 with an operator having the ability to override the controller 44 and take control of the excavator operation. Such overrides may be desired where for example, the operator determines that the ditch template 89 at a selected interval may not provide the desired drainage or an obstacle exists in the field that was not recognized in the surveying and imaging steps.

It is to be understood that while certain forms of the present invention have been illustrated and described herein, it is not to be limited to the specific forms or arrangement of parts described and shown.

What is claimed as new and desired to be secured by Letters Patent is:

1. A method for automated track surveying and maintaining ditching along a railway and comprising the steps of:
    moving a survey vehicle along a section of said railway;
    obtaining survey vehicle position coordinates of said survey vehicle at intervals spaced along said section of railway using a survey vehicle position coordinate system;
    optically scanning said railway at each of said intervals to obtain optical data points, each of said optical data points having position coordinates associated therewith;
    logging position coordinates of drainage points along said railway section;
    processing said optical data points to obtain ditch profiles corresponding to said intervals and extending in a plane oriented transverse to said railway section;
    providing planar ditch templates oriented transverse to said railway section and associated with said intervals corresponding to ditch contours required to promote positive drainage toward respective ones of said drainage points;
    graphically overlaying said ditch profiles of said intervals on ditch templates corresponding to said intervals to form ditch overlays displaying soil to be excavated or deposited to eliminate differences between said ditch templates and said ditch profiles at said intervals;
    displaying said ditch overlays corresponding to locations of an excavating tool of an excavator vehicle supported on and moveable along said railway section to enable an excavator operator to move the excavating tool of the excavator vehicle to excavate or deposit soil in a ditch to obtain a ditch profile at an interval similar to the ditch template associated therewith;
    referencing horizontal locations of said ditch profiles and said ditch templates and a horizontal position coordinate of said excavation tool to a center line extending longitudinally between tops of rails of said railway and intersecting a vertical axis; and
    referencing vertical locations of said ditch profiles and said ditch templates and a vertical position coordinate of said excavation tool to a transverse axis extending through said tops of said rails perpendicular to said center line and intersecting said vertical axis.

2. A method as set forth in claim 1 wherein said step of recording image data includes the step of:
    recording panoramic image data of said railway at each of said intervals.

3. A method as set forth in claim 1 and including the step of: obtaining said track profile data points by optically scanning said railway using a laser scanning device.

4. A method as set forth in claim 1 and including the step of: obtaining said survey vehicle position coordinates using an inertial measurement unit.

5. A method as set forth in claim 1 and including the step of: obtaining said survey vehicle position coordinates using a global positioning system receiver.

6. A method as set forth in claim 1 and including the step of: obtaining said survey vehicle position coordinates using a wheel encoder of said survey vehicle.

7. A method as set forth in claim 1 and including the step of: obtaining said position coordinates of said excavator vehicle using an excavator inertial measurement unit.

8. A method as set forth in claim 1 and including the step of: obtaining said position coordinates of said excavator vehicle using an excavator global positioning system receiver.

9. A method as set forth in claim 1 and including the step of: obtaining said position coordinates of said excavator vehicle using an excavator wheel encoder on said excavator vehicle.

10. The method as set forth in claim 1 including the step of referencing the position of a vertical pivot axis of a chassis of said excavator with the vertical axis intersecting the centerline extending longitudinally between tops of rails of said railway.

11. A method for automated track surveying and maintaining ditching along a railway and comprising the steps of:
    moving a survey vehicle along a section of said railway;
    obtaining survey vehicle position coordinates of said survey vehicle at intervals spaced along said section of railway using a survey vehicle position coordinate system;
    concurrently:
        optically scanning said railway at each of said intervals to derive optical data points representing elements of said railway at said intervals;
        recording an image of said railway along said railway section; and
        logging position coordinates of drainage points along said railway section;
    processing said optical data points to obtain ditch profiles of said railway section corresponding to said intervals and extending in a plane oriented transverse to said railway section;
    providing planar ditch templates oriented transverse to said railway section and associated with said intervals corresponding to ditch contours required to promote positive drainage toward respective ones of said drainage points;
    graphically overlaying said ditch profiles of said intervals on ditch templates corresponding to said intervals to form ditch overlays displaying soil units to be excavated or deposited to eliminate differences between said ditch templates and said ditch profiles at said intervals;
    processing said ditch overlays to detect apparent anomalous soil units;
    providing access to recorded images corresponding to intervals of said railway section associated with any anomalous soil units to enable review thereof;
    providing access to selected ditch overlays associated with said anomalous soil units to enable adjustment thereof to appropriate levels of soil units in response to reviewing image data associated therewith;
    providing an excavation vehicle supported on and moveable along said railway section and having an excavator vehicle position coordinate system interfaced to an excavation computer with an excavation computer display; and
    loading said survey vehicle position coordinates and data representing said ditch overlays, including adjusted ditch overlays, into said ditch excavation computer on said ditch excavation vehicle to thereby display to an excavator operator said ditch overlays corresponding to locations of a bucket of the excavator relative to said intervals of said railway to thereby facilitate movement of said bucket for excavation or deposition of said soil units to conform said ditch profiles to corresponding ditch templates at said intervals.

12. A method as set forth in claim 11 wherein said step of recording image data includes the step of:

recording panoramic image data of said railway at each of said intervals.

13. A method as set forth in claim 11 and including the step of:
   obtaining said ditch profile data points by optically scanning said railway using a laser scanning device.

14. A method as set forth in claim 11 and including the step of:
   obtaining said survey vehicle position coordinates using an inertial measurement unit.

15. A method as set forth in claim 11 and including the step of:
   obtaining said survey vehicle position coordinates using a global positioning system receiver.

16. A method as set forth in claim 11 and including the step of:
   obtaining said survey vehicle position coordinates using a wheel encoder of said survey vehicle.

17. A method as set forth in claim 11 and including the step of:
   obtaining said position coordinates of said excavator vehicle using an inertial measurement unit.

18. A method as set forth in claim 11 and including the step of:
   obtaining said position coordinates of said excavator vehicle using a global positioning system receiver.

19. A method as set forth in claim 11 and including the step of:
   obtaining said position coordinates of said excavator vehicle using an excavator wheel encoder on said excavator vehicle.

20. A method as set forth in claim 11 and including the steps of:
   referencing horizontal locations of said ditch profiles and said ditch templates, and a horizontal position coordinate of said bucket to a center line extending longitudinally between tops of rails of said railway and intersecting a vertical axis; and
   referencing vertical locations of said ditch profiles and said ditch templates, and a vertical position coordinate of said bucket to a transverse axis extending through said tops of said rails perpendicular to said center line and intersecting said vertical axis.

21. The method as set forth in claim 20 including the step of referencing the position of a vertical pivot axis of a chassis of said excavator with the vertical axis intersecting the centerline extending longitudinally between tops of rails of said railway.

* * * * *